US011562138B2

(12) United States Patent
Halai et al.

(10) Patent No.: US 11,562,138 B2
(45) Date of Patent: Jan. 24, 2023

(54) DELIVERING AUTO-PLAY MEDIA CONTENT ELEMENT FROM CROSS ORIGIN RESOURCES

(71) Applicant: Google LLC, Mountain View, CA (US)

(72) Inventors: Murtaza Halai, Mountain View, CA (US); Lloyd Dee Thompson, Mountain View, CA (US); Brian Mulford, Mountain View, CA (US); Armen Mkrtchyan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 165 days.

(21) Appl. No.: 16/983,525

(22) Filed: Aug. 3, 2020

(65) Prior Publication Data
US 2021/0019473 A1 Jan. 21, 2021

Related U.S. Application Data

(63) Continuation of application No. 15/447,009, filed on Mar. 1, 2017, now Pat. No. 10,733,376.

(51) Int. Cl.
*H04L 67/01* (2022.01)
*H04L 67/02* (2022.01)
(Continued)

(52) U.S. Cl.
CPC ............ *G06F 40/221* (2020.01); *G06F 16/95* (2019.01); *G06F 21/602* (2013.01);
(Continued)

(58) Field of Classification Search
CPC ........... G06F 17/272; G06F 2221/2119; G06F 16/95; G06F 21/602; G06F 16/958;
(Continued)

(56) References Cited

U.S. PATENT DOCUMENTS 9,372,681 B1 6/2016 Shevchenko et al.
9,402,112 B1 7/2016 Levine et al.
(Continued)

OTHER PUBLICATIONS

Examination Report for EP Appln. Ser. No. 17829789.1 dated Apr. 1, 2021 (5 pages).
(Continued)

*Primary Examiner* — Stephen S Hong
*Assistant Examiner* — Ahamed I Nazar
(74) *Attorney, Agent, or Firm* — Marshall, Gerstein & Borun LLP

(57) ABSTRACT

Systems and methods for delivering cross-site auto-play media are described herein. The server can receive, from a client device, a request for media content at a first domain embedded in a content element from a second domain. The request can include an identifier indicating that the client device is configured to restrict cross-domain redirection. The server can determine, responsive to identifying the identifier indicating that the client device is configured to restrict cross-domain redirection, that the request comprises a content type header having a first predetermined value. The server can generate, responsive to the determination, a response comprising the media content element in a body of the response. The server can transmit the response to the client device. Receipt of the response can cause the client device to extract the media content element from the body of the response and to render the media content element.

20 Claims, 6 Drawing Sheets

(51) Int. Cl.
*G06F 40/221* (2020.01)
*G06F 16/95* (2019.01)
*H04L 9/40* (2022.01)
*G06F 21/60* (2013.01)

(52) U.S. Cl.
CPC ............ *H04L 63/101* (2013.01); *H04L 67/01* (2022.05); *H04L 67/02* (2013.01); *G06F 2221/2119* (2013.01)

(58) Field of Classification Search
CPC ....... H04L 67/42; H04L 67/02; H04L 63/101; H04L 65/60; H04L 65/4084
See application file for complete search history.

(56) References Cited

U.S. PATENT DOCUMENTS

| | | | |
|---|---|---|---|
| 2002/0023159 | A1 | 2/2002 | Vange et al. |
| 2004/0049579 | A1 | 3/2004 | Ims et al. |
| 2008/0209563 | A1 | 8/2008 | Rogers et al. |
| 2009/0271690 | A1 | 10/2009 | Iglesias |
| 2010/0281107 | A1 | 11/2010 | Fallows et al. |
| 2012/0110062 | A1* | 5/2012 | Savage ............... H04L 67/01 709/203 |
| 2013/0061291 | A1* | 3/2013 | Hegg ................ H04L 63/0876 726/4 |
| 2013/0246266 | A1 | 9/2013 | Coleman et al. |
| 2014/0006924 | A1* | 1/2014 | Tsolis .................. G06F 16/972 715/234 |
| 2014/0157369 | A1 | 6/2014 | Mischook et al. |
| 2014/0344663 | A1* | 11/2014 | Joel .................... H04L 67/02 715/234 |
| 2015/0143223 | A1* | 5/2015 | Kolam .................. H04L 69/329 715/234 |
| 2015/0188779 | A1 | 7/2015 | McCanne et al. |
| 2015/0348089 | A1* | 12/2015 | Geller .................. G06F 16/74 705/14.42 |
| 2016/0080515 | A1 | 3/2016 | Kruglick |
| 2016/0134554 | A1 | 5/2016 | Deckers |
| 2016/0248833 | A1 | 8/2016 | Hiltch et al. |
| 2016/0351231 | A1* | 12/2016 | Woods ................. H04N 19/593 |
| 2017/0063778 | A1 | 3/2017 | Rachitskiy et al. |
| 2017/0272531 | A1 | 9/2017 | Zhang |

OTHER PUBLICATIONS

Final Office Action for U.S. Appl. No. 16/344,731 dated May 26, 2021 (11 pages).
First Office Action for CN Appln. Ser. No. 201711329278.3 dated Aug. 4, 2020 (20 pages).
Non-Final Office Action for U.S. Appl. No. 16/344,731 dated Oct. 16, 2020 (17 pages).
Van Kesteren, Anne, "Cross-Origin Resource Sharing", W3C, Jan. 16, 2014, retrieved Oct. 9, 2020 from URL: https:www.w3.org/TR/2014/REC-cors-20140116 (16 pages).
"Cross-Origin Resource Sharing (CORS)", Mozilla.org, retrieved Jun. 11, 2018 from URL: https://developer.mozilla.org/en-US/docs/Web/HTTP/CORS (20 pages).
"Simple Example of Scripting in a Web Page (Windows)", Jan. 1, 2015, XP055451453, retrieved Feb. 15, 2018 from URL: https://web.archive.org/web/20150101131344/https://msdn.microsoft.com/en-us/library/windows/desktop/dd564350(v=vs.85).aspx (3 pages).
Examination Report for EP Appln. Ser. No. 17829789.1 dated Apr. 6, 2020 (7 pages).
Examination Report for EP Appln. Ser. No. 17829789.1 dated Mar. 21, 2019 (6 pages).
Final Office Action for U.S. Appl. No. 15/447,009 dated Jan. 25, 2019 (23 pages).
Gardon, Mathis, "HTTP 302 Redirect to a CORS request is dropped by browsers", Stack Overflow, Apr. 6, 2016, XP055450719, retrieved Feb. 13, 2018 from URL:https://web.archive.org/web/20160406103219/http://stackoverflow.com:80/questions/28917489/http-302-redirect-to-a-cors-request-is-dropped-by-browsers (2 pages).
Gardon, Mathis, "HTTP 302 Redirect to a CORS request is dropped by browsers", Stack Overflow, Apr. 6, 2016, retrieved Mar. 16, 2020 from URL: https://stackoverflow.com/questions/28917489/http-302-redirect-to-a-cors-request-is-dropped-by-browsers (3 pages).
International Preliminary Report on Patentability for PCT Appln. Ser. No. PCT/US2017/066513 dated Sep. 12, 2019 (14 pages).
International Search Report and Written Opinion for PCT Appln. Ser. No. PCT/US2017/066513 dated Mar. 1, 2018 (17 pages).
Non-Final Office Action for U.S. Appl. No. 15/447,009 dated Apr. 10, 2018 (19 pages).
Notice of Allowance for U.S. Appl. No. 15/447,009 dated Apr. 7, 2020 (6 pages).
Notice of Allowance for U.S. Appl. No. 15/447,009 dated Jul. 9, 2020 (2 pages).
Notice of Allowance for U.S. Appl. No. 15/447,009 dated Oct. 9, 2019 (8 pages).
Search and Examination Report for GB Appln. Ser. No. GB1720749.9 dated Jun. 12, 2018 (7 pages).
First Office Action for CN Appln. Ser. No. 201780014548.3 dated Jul. 5, 2021 (24 pages).

* cited by examiner

DELIVERING AUTO-PLAY MEDIA CONTENT ELEMENT FROM CROSS ORIGIN RESOURCES

CROSS REFERENCE TO RELATED APPLICATIONS

The present application claims priority under 35 U.S.C. § 120 as a continuation of U.S. patent application Ser. No. 15/447,009, titled "Delivering Auto-Play Media Content Element from Cross Origin Resources," filed Mar. 1, 2017, which is incorporated herein by reference in its entirety.

BACKGROUND

In a computer networked environment, such as the Internet, content elements (e.g., webpages) may be rendered by an application (e.g., web browser) executing at a client device. Other content elements may be embedded within the primary content element (e.g., an inline frame element embedded in a body element). These embedded content elements may be received by the client device via the computer networked environment from a server different from that of the primary content element.

SUMMARY

Under the Same-Origin Policy, web browsers may restrict content originating from domains other than that of the primary content element for security purposes. The Same-Origin Policy may allow web browsers to access embedded content from different domains under circumstances specified under the Cross-Origin Resource Sharing (CORS) protocol. The protocol may allow web browsers to fetch certain types of content originating across different domains, such as plain textual data ("text/plain"), multi-part form data ("x-www-form-urlencoded"), and application encoded form data ("application/x-www-form-urlencoded") using specified methods (e.g., GET, HEAD, and POST). Under these specifications, the web browser operating on the client device can send a request to the server associated with the different domain to request for the content. In some implementations, the web browser may first send a preflight request (e.g., OPTIONS method) to the other domain of the embedded content to determine whether the domain is secure. The server can send a response granting permission to the requested domain and may specify which actions may be taken. Once the permission is received, the web browser may then send another request for the embedded content. The preflight request may allow for additional types of content to be received from and additional methods to be sent to the other domain.

One limitation with the CORS protocol may be that all domains in a redirect response (e.g., a 302 response) are to be restricted. Under this specification, if the server attempts to return a redirect response for a domain different from that of the primary content, the response may be rewritten to block all domains. To resolve some of these challenges, the client device may be configured to add a parameter to the request to signal to the server to return a success response with the domain of the redirected content in the body of the response. The server may in turn send a response indicating success (e.g., 200 response) with the domain of the other content in the body of the response. In this manner, the client device may extract the resource address in the response and send another request with the resource domain to retrieve the corresponding content. Sending a success response as opposed to a redirect response may bypass the restrictions specified by CORS for redirect responses.

While the CORS protocol allows display of content from different sources, security protocols on client devices may still impair this functionality. Certain types of web browsers may block auto-playing of media content elements (e.g., HTML video content element embedded in another content element) by default without explicit user-interaction. To circumvent this restriction, the web browser may be configured to send a request for media content element with or without the parameter added to signal the server. The content type header of the request may be specified as textual or non-textual to flag to the server which type of content the client device may be expecting. If the content type header is textual, the server may send a response with the domain of the media content element in the body of the response. If the content type header is non-textual, the server may insert an encoded version of the media content element in the body of the response. The encoding of the media content element may be JAVASCRIPT code that the web browser can compile and execute to form an HTML canvas element. Upon receipt, the client device may extract the content of the body and decode the media content element to render and automatically play on the primary content element.

At least one aspect is directed to a method of delivering cross-site auto-play media. The data processing system can receive, from a client device, a request for media content at a first domain embedded in a content element from a second domain. The request can include an predefined identifier indicating that the client device is configured to restrict cross-domain redirection. The data processing system can determine, responsive to identifying the first domain as different from the second domain and to identifying the predefined identifier indicating that the client device is configured to restrict cross-domain redirection, that the request comprises a content type header having a first predetermined value. The data processing system can generate, responsive to determining that the request comprises the content type header having the first predetermined value, a response comprising the media content element in a body of the response. The data processing system can transmit the response to the client device. Receipt of the response can cause the client device to render the media content element in the body of the response.

In some implementations, receiving the request for media content element can further include receiving the request for media content element, the request including a device type identifier for the client device. In some implementations, the data processing system can determine that the client device is configured to restrict automatic rendering of the media content element encoded in a first format based on the device type identifier. In some implementations, the data processing system can transcode, responsive to determining that the client device is the mobile device, the media content element from a first format to a second format. In some implementations, the client device may be configured to restrict automatic rendering of the media content element encoded in the first format and to permit rendering the media content element encoded in the second format.

In some implementations, the predefined identifier of the request can include an application type identifier for an application executing on the client device. In some implementations, the data processing system can identify that the application type identifier for the application executing on the client device corresponds to a predesignated application. In some implementations, the data processing system can determine that the request comprises the content type header having the first predetermined value, responsive to identifying that the application type identifier corresponds to the predesignated application.

In some implementations, the data processing system can search a whitelist for the first domain. The whitelist can specify a plurality of domains permitted with the embedded media content element. In some implementations, generating the response can further include generating the response responsive to determining that the first domain is on the whitelist.

In some implementations, the data processing system can receive, from a second client device, a second request for media content element at a third domain embedded in a content element from a fourth domain. The second request can include the predefined identifier indicating that the second client device is configured to restrict cross-domain restriction. In some implementations, the data processing system can determine, responsive to identifying the third domain as different from the fourth domain and to identifying that the second request includes the predefined identifier, that the second request comprises a content type header having a second predetermined value different from the first predetermined value. In some implementations, the data processing system can generate responsive to determining that the request comprises the content type header having the second predetermined value, a second response comprising an address for requested media content element in a body of the second response and a status identifier indicating success in a header of the second response. In some implementations, the data processing system can transmit the second response to the second client device. Receipt of the second response can cause the second client device to transmit a third request for the requested media content element to the extracted address.

In some implementations, the data processing system can determine, responsive to receiving the second request from the second client device, that a number of redirect requests for the second client device is less than a predefined threshold. In some implementations, determining that the second request comprises the content type header type having the second predetermined value can further include determining that the second request comprises the content type header type having the second predetermined value, responsive to determining that the number of redirect requests is less than the predefined threshold. In some implementations, the second predetermined value of the content type header in the second response can indicate textual content. In some implementations, the first predetermined value of the content type header in the response can indicate non-textual content. In some implementations, generating the response can further include generating the request including executable code in the body of the response to instantiate a media player.

At least one aspect is directed to a system for delivering cross-site auto-play media. A response parser can be executed on a data processing system with one or more processors. The response parser can receive a request for media content at a first domain embedded in a content element from a second domain. The request can include a predefined identifier indicating that the client device is configured to restrict cross-domain redirection. The response parser can determine, responsive to identification of the first domain as different from the second domain and to identification of the predefined identifier indicating that the client device is configured to restrict cross-domain redirection, that the request comprises a content type header having a first predetermined value. A response rewriter can be executed on the data processing system. The response rewriter can generate, responsive to determination that the request comprises the content type header having the first predetermined value, a response comprising the media content element in a body of the response. response rewriter can transmit the response to the client device. Receipt of the response can cause the client device to render the media content element from the body of the response.

In some implementations, the request can include a device type identifier for the client device. In some implementations, the request handler can determine that the client device is configured to restrict automatic rendering of the media content element encoded in a first format based on the device type identifier. In some implementations, a media encoder can be executed on the data processing system. The media coder can encode, responsive to the determination that the client device is the mobile device, the media content element from a first format to a second format. The client device can be configured to restrict automatic rendering of the media content element encoded in the first format and to permit rendering the media content element encoded in the second format.

In some implementations, the predefined identifier of the request can include an application type identifier for an application executing on the client device. In some implementations, the request handler can identify that the application type identifier for the application executing on the client device corresponds to a predesignated application. In some implementations, the request handler can determine that the request comprises the content type header having the first predetermined value, responsive to the identification that the application type identifier corresponds to the predesignated application.

In some implementations, the request handler can search whitelist for the first domain. The whitelist can specify a plurality of domains permitted with the embedded media content element. In some implementations, the response rewriter can generate the response responsive to determining that the first domain is on the whitelist.

In some implementations, the request handler can receive a second request for media content element at a third domain embedded in a content element from a fourth domain. The second request can include the predefined identifier indicating that the second client device is configured to restrict cross-domain restriction. In some implementations, the request handler determine, responsive to identification of the third domain as different from the fourth domain and to identifying that the second request includes the predefined identifier, that the second request comprises a content type header having a second predetermined value different from the first predetermined value. In some implementations, the response rewriter can generate, responsive to the determination that the request comprises the content type header having the second predetermined value, a second response comprising an address for requested media content element in a body of the second response and a status identifier indicating success in a header of the second response. In some implementations, the response rewriter can transmit the second response to the second client device. Receipt of the second response can cause the second client device to transmit a third request for the requested media content element to the extracted address identified in the body of the response.

In some implementations, the request handler can determine, responsive to the receipt of the second request from the second client device, that a number of redirect requests for the second client device is less than a predefined threshold. In some implementations, the request handler can determine that the second request comprises the content type header type having the second predetermined value, responsive to determining that the number of redirect requests is less than the predefined threshold. In some implementations, the second predetermined value of the content type header in the second response can indicate textual content. In some implementations, the first predetermined value of the content type header in the response can indicate non-textual content. In some implementations, the response rewriter can generate the request including executable code in the body of the response to instantiate a media player. In some implementations, the response can include a status code lacking a redirect code.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
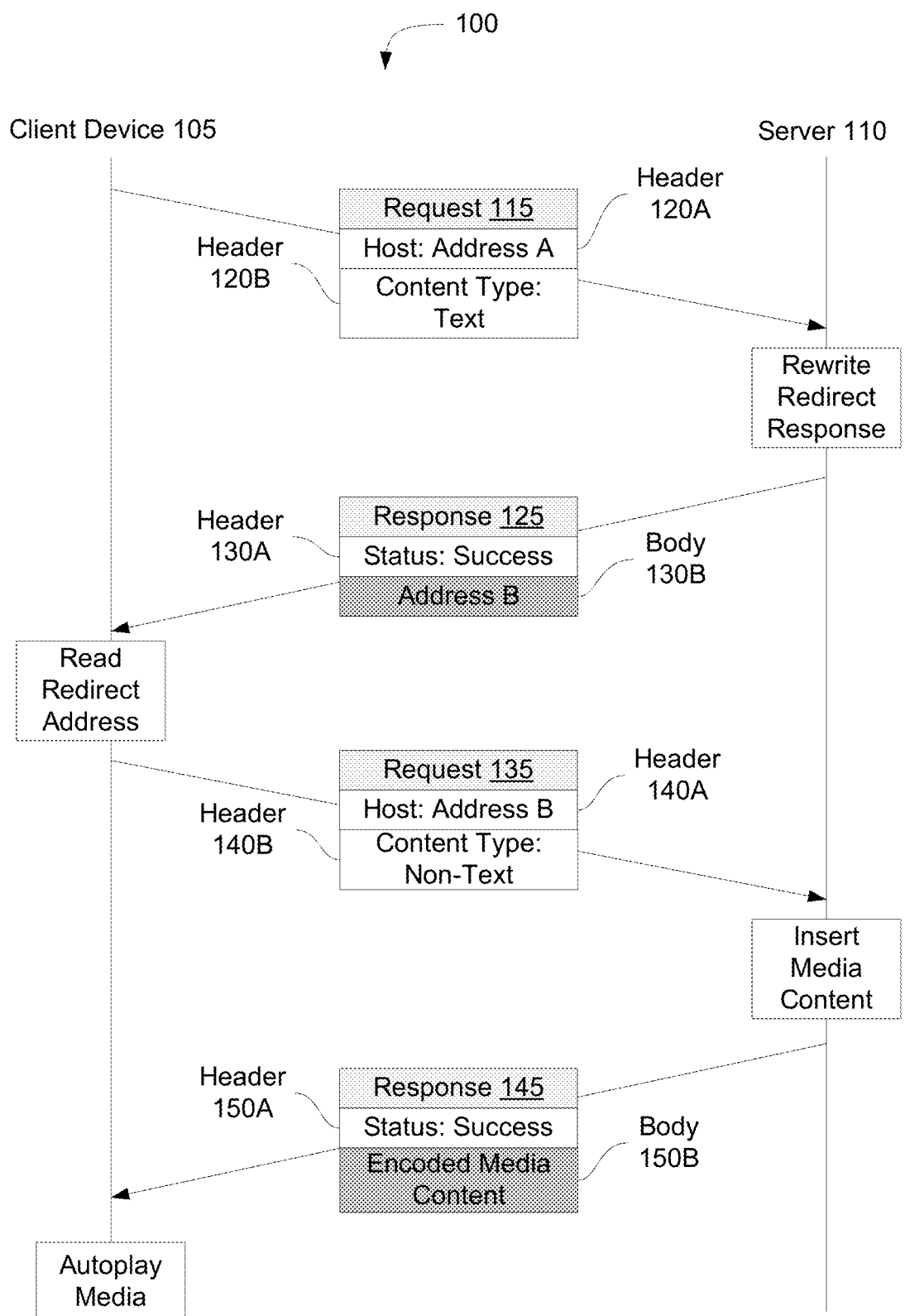
FIG. 1 is a process diagram depicting one implementation of delivering cross-site auto-play media in a computer network environment, according to an illustrative implementation.

Following below are more detailed descriptions of various concepts related to, and implementations of, methods, apparatuses, and systems of delivering cross-site auto-play media in a computer network environment. The various concepts introduced above and discussed in greater detail below may be implemented in any of numerous ways, as the described concepts are not limited to any particular manner of implementation.

Under the Same-Origin Policy, web browsers may restrict content originating from domains other than that of the primary content element for security purposes. The Same-Policy Policy may allow web browsers to access embedded content from different domains under circumstances specified under the Cross-Origin Resource Sharing (CORS) protocol. The protocol may allow web browsers to fetch certain types of content originating across different domains, such as plain textual data ("text/plain"), multi-part form data ("x-www-form-urlencoded"), and application encoded form data ("application/x-www-form-urlencoded"), among others, using specified methods (e.g., GET, HEAD, and POST). Using these specifications, the web browser operating on the client device can send a request ("simple request") to the server associated with the different domain to request for the content. In addition, the web browser may first send a preflighted request (e.g., OPTIONS method) to the other domain of the embedded content determine whether the domain is secure. The server can send a response granting permission to the requested domain and may specify which actions may be taken. Once the permission is received, the web browser may then send another request using one of the specified methods for the embedded content. The preflight request may allow for additional types of content and additional methods to be sent to the other domain.

One limitation with the CORS protocol may be that all domains in a redirect response (e.g., a 302 response) are to be restricted. Under this specification, if the server attempts to return a redirect response for a domain different from that of the primary content, the response may be rewritten to block all domains. To resolve some of these challenges, the client device may be configured to add a parameter to the request to signal to the server to return a success response with the domain of the redirected content in the body of the response. The server may in turn send a response indicating success (e.g., 200 response) with the domain of the other content in the body of the response. In this manner, the client device may extract the resource address in the response and send another request with the resource domain to retrieve the corresponding content. Sending a success response as opposed to a redirect response may bypass the restrictions specified by CORS for redirect responses.

While the CORS protocol allows display of content from different sources, security protocols on client devices may still impair this functionality. Certain web browsers may block auto-playing of media content elements (e.g., HTML video content element embedded in another content element) by default without explicit user-interaction. To address these and other technical challenges, a script executing on the client device and a request handler running on the server may be configured to generate and exchange data to facilitate auto-playable media content elements.

Referring to FIG. 1, depicted is a signal flow diagram depicting one implementation of a process 100 for delivering cross-site auto-play media in a computer network environment. In the depicted process 100, an agent (e.g., web browser, plug-in, agent, service, etc.) executing on a client device 105 may be configured to restrict or block loading of embedded content elements originating from a domain different from a primary content element in a redirect response pursuant to the CORS protocol. The agent of the client device 105 may also be configured for blocking of auto-playable media content elements of a specific content type (e.g., HTML video content elements). To resolve both constraints, in some implementations, a script may be provided to the client device 105 to configure the agent executing thereon to generate requests and parse responses in a manner specified by the script. The script may be received by the client device 105 with the embedded content element or with the primary content element, or separate from both the embedded content element and the primary content element (e.g. with a web page, CSS stylesheet, etc.). A request handler running on a server 110 (e.g., data processing system) may also be configured to parse responses from the client device 105 and generate responses to allow the client device 105 to auto-play the media content element.

In a first step of process 100, the client device 105 may generate and transmit an initial request 115. In generating the initial request 115, the client device 105 may determine that a domain of the embedded media content element differs from a domain of the primary content element, signaling that the request 115 is to be in conformance to the CORS protocol. In response to this determination, the client device 105 may generate the request 115 (e.g., a POST, GET, or OPTIONS request). The client device 105 may set a host header 120A to the domain of the embedded media content element (e.g., "Address A") to direct the request 105 to the server 110 associated with the domain. The server 110 may be different from the server that provided the client device 105 with the primary content element. The client device may further set a content type header 120B to textual (e.g., "text/plain") to indicate to the server 110 which type of content the client 105 is requesting. The client device 105 may also include a parameter in the request 115 (e.g., in the hostname of the header 120A, in an options field, in a parameter-value pair of a URL, etc.) to signal to the server 110 that the client device 105 may be expecting the redirect address in the body of a response. The request 115 may then be sent by the client device 105 to the server 110 corresponding to the address of the embedded media content element for redirection to a third party content server.

Upon receipt of the request, server 110 can receive and parse the request 115. The server 110 can identify the address of the embedded media content element from the host header 120A. The server 110 can determine that the client device 105 is to be redirected to another address (e.g. of a third party content server) based on the request 115, such as by using the parameter added to the request 115, based on the content type header 120B set to "text," or based on the address included in the host header 120A. Based on the determination, the server 110 can identify the second address (e.g., "Address B") that the client device 105 is to be redirected to. The second address may include the same host name as the first address included in the host header 120A of the request 115. The server 110 can generate a response 125. Rather than including a redirection status code (e.g., 302 found), the server 110 can set a status code header 130A of the response 125 to success (e.g., 200 OK). The server 110 can include the other address to which the client device 105 is to be redirected to in the body 130B of the response 125. The response 125 may then be sent to the client device 105.

Upon receipt of the response 125, the client device 105 may parse the response 125 to identify the redirect address (e.g., "Address B") in the body 130B of the response 125. As the status code header 130 of the response 125 indicates success as opposed to a redirect (e.g. code 302), the client device 105 may be able to access content from the domain different from that of the primary content element, bypassing the restrictions regarding redirect responses in the CORS protocol: browser security settings that would be triggered by the 302 redirect code are not triggered by the OK 200 code. The response 125 set to the success may also allow the client device 105 to send additional requests to servers of domains besides that of the primary content element. The client device 105 may in turn generate a second request 135 (e.g., using the POST method). In the request 135, the client device 105 may set a host header 140A to include the redirect address (e.g., "Address B") referring to the address of the media content element. The client device 105 may also set a content type header 140B to "non-textual" or a similar setting to indicate to the server 110 that the client device 105 may be expecting data for the embedded media content element. The client device 105 may further add another parameter in the request 135 to signal to the server 110 that the client device 105 was redirected to the other address. The request 135 may then be transmitted by the client device 105 to the server 110. It should be noted that the client device 105 can send any number of requests with the content type header set to "textual" prior to sending a request with the content type header set to "non-textual".

Having obtained the second request 135, the server 110 can parse the request 135 and identify the two headers 140A and 140B of the request 135. The server 110 can identify the content type header 140B as set to "non-textual" signaling that the client device 105 may be expecting the embedded content element, rather than a redirect response. In response to the identification of the content type header 140B as set to "non-textual", the server 110 can identify the address included in the host header 140A. Using the address, the server 110 can access a media content element database to obtain the media content element. The media content element may be of a format that may be restricted by the web browser running on the client device 105, such as an HTML video content element. To circumvent the restriction, the server 110 can encode the media content element in a different format (e.g., using JAVASCRIPT to form an HTML canvas content element). The server 110 can in turn generate a response 145, set the status code header 150A to success (e.g. 200 OK), and insert the encoded media content element into the body 150B. The response 145 can be transmitted to the client device 105.

Having received the response 145, the client device 105 can parse the response 145 to identify the encoded media content element from the body 150B. Because the body of the response 150B includes the media content element encoded in a format not restricted from auto-play by the client device 105, the client device 105 may automatically render and play the embedded media content element on the web browser. In the manner described in process 100, both the client device 105 and the server 110 may be able to address or circumvent technical challenges and bypass restrictions regarding restrictions to redirects under the CORS protocol and blocking of auto-playing of media content elements set by certain web browsers.

Figure 2:
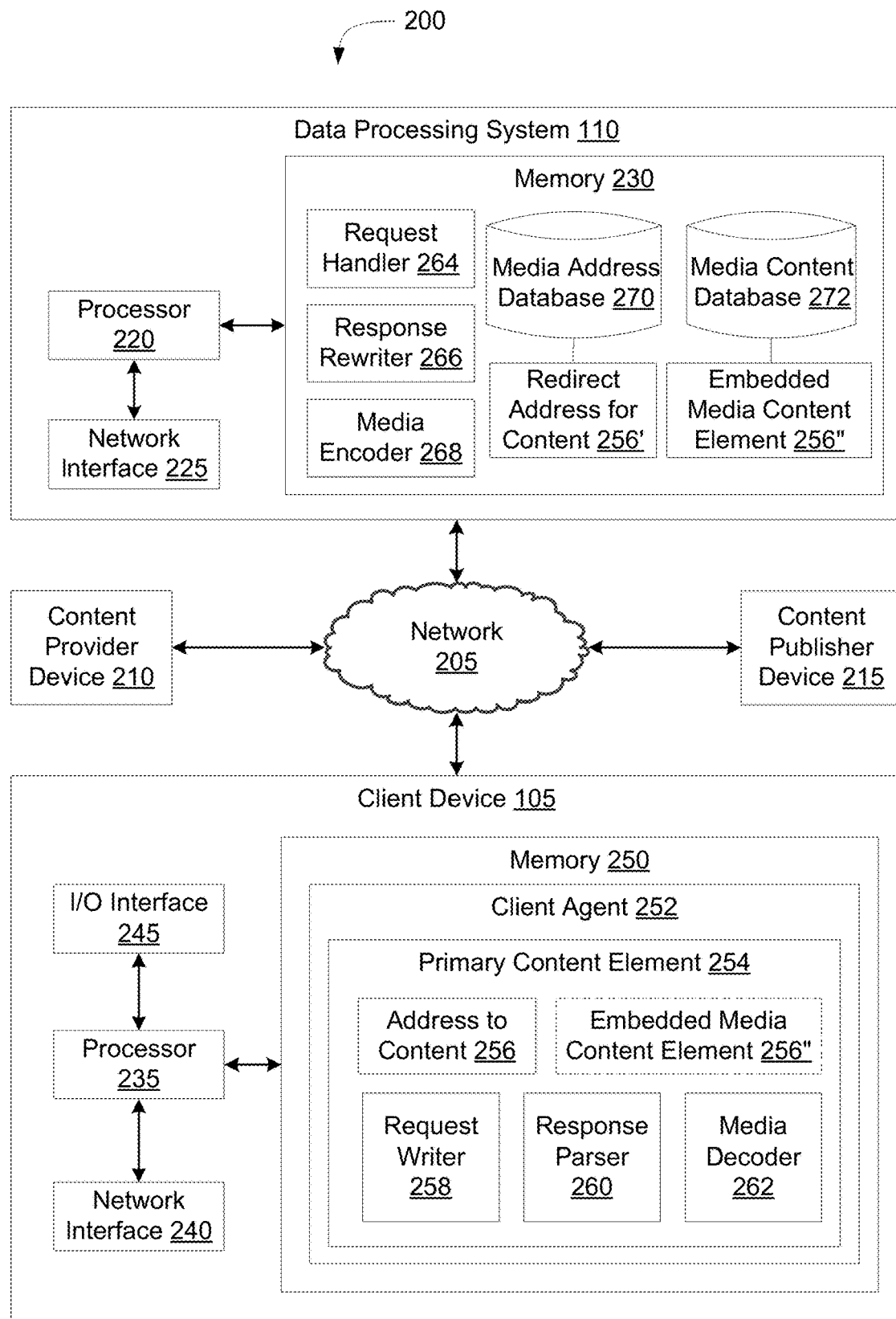
FIG. 2 is a block diagram depicting one implementation of a system for delivering cross-site auto-play media in a computer network environment, according to an illustrative implementation.

Referring now to FIG. 2, illustrated is a block diagram depicting one implementation of an environment for delivering cross-site auto-play media. The environment 200 includes the client device 105, the data processing system 110, a network 205, a content provider device 210, and a content publisher device 215. In overview, each of the client device 105, the data processing system 110, the content provider device 210, and the content publisher device 215 can communicate with one another via the network 205. The client device 105, the content provider computing device 215, and the content publisher computing device 215 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 205.

The network 205 can include computer networks such as the internet, local, wide, metro or other area networks, intranets, satellite networks, other computer networks such as voice or data mobile phone communication networks, and combinations thereof. The data processing system 110 of the system 200 can communicate via the network 205, for instance with the content provider computing device 215, the content publisher computing device 215, or the client device 105. The network 205 may be any form of computer network that relays information between the client device 105, data processing system 110, and one or more content sources, such as web servers, advertising servers, amongst others. The network 205 may include the Internet and/or other types of data networks, such as a local area network (LAN), a wide area network (WAN), a cellular network, satellite network, or other types of data networks. The network 205 may also include any number of computing devices (e.g., computer, servers, routers, network switches, etc.) that are configured to receive and/or transmit data within network 205. The network 205 may further include any number of hardwired and/or wireless connections. In some implementations, the client device 105 may communicate wirelessly (e.g., via WiFi, cellular, radio, etc.) with a transceiver that is hardwired (e.g., via a fiber optic cable, a CAT5 cable, etc.) to other computing devices, such as the data processing system 110, the content provider device 210, and the content publisher device 215, in network 205.

The content provider computing device(s) 210 can include servers or other computing devices operated by a content provider entity to provide content elements for display on primary content elements at the client device 105. The content provided by the content provider computing device 215 can include embedded content elements for display on primary content elements (e.g., a webpage), such as a website or web page that includes primary content, e.g., content provided by the content publisher computing device 215. The content elements can also be displayed on a search results web page. In some implementations, the content provider computing device 215 can provide or be the source of content elements for display in content slots of primary content elements, such as a web page of a company where the primary content of the web page is provided by the company, or for display on a search results landing page provided by a search engine. The content elements associated with the content provider computing device 215 can be displayed on primary content elements other than web pages, such as content displayed as part of the execution of an application on a smartphone or other client device 105. In some implementations, the content provider computing device 210 can include a server for serving media content elements, such as video content elements.

The content publisher computing device(s) 215 can include servers or other computing devices operated by a content publishing entity to provide primary content element for display via the network 205. The content publisher computing device 215 can include a web page operator who provides primary content for display on the web page. The primary content can include content other than that provided by the content publisher computing device 215, and the primary content element can include content slots configured for the display of embedded content elements from the content provider computing devices 210. For instance, the content publisher computing device 215 can operate the website of a company and can provide content about that company for display on web pages of the website. The web pages can include content slots configured for the display of embedded content elements such as ads of the content provider computing device 215. In some implementations, the content publisher computing device 215 includes a search engine computing device (e.g. server) of a search engine operator that operates a search engine website. The primary content element of search engine web pages (e.g., a results or landing web page) can include results of a search as well as embedded content elements displayed in content slots such as embedded content elements from the content provider computing device 215. In some implementations, the content publisher computing device 215 can include a server for serving media content elements, such as video content elements.

The content provider computing device(s) 210 and the content publisher computing device(s) 215 can each include a processor and a memory. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing device(s) 210 and the content publisher computing device(s) 215 may also include one or more user interface devices. In general, a user interface device may include any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing device(s) 210 and the content publisher computing device(s) 215 (e.g., a built-in display, microphone, etc.) or external to the housing of content provider computing device(s) 210 and the content publisher computing device(s) 215 (e.g., a connected monitor, or a connected speaker, etc.), according to various implementations. The content provider computing device(s) 210 and the content publisher computing device(s) 215 may each include an electronic display, which visually displays web pages using webpage data received from one or more content sources and/or from the computing devices connected via the network 205.

The data processing system 110 can include can include at least one processor 220, a network interface 225, and a memory 230. The processor 220, the network interface 225, and the memory 230 may be those detailed below in conjunction with FIG. 4. The memory 230 stores processor-executable instructions that, when executed by processor 220, cause the processor to perform one or more of the operations described herein. The processor 220 may include a microprocessor, application-specific integrated circuit (ASIC), field-programmable gate array (FPGA), etc., or combinations thereof. The memory 230 may include, but is not limited to, electronic, optical, magnetic, or any other storage or transmission device capable of providing the processor with program instructions. The memory 230 may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The network interface 225 may be used by the processor 220 to communicate with computing devices connected to the network 205. The data processing system 110 can include one or more computing devices or servers that can perform various functions.

The data processing system 110 can include one or more servers. In some implementations, the data processing system 110 can include a plurality of servers located in at least one data center or server farm. The data processing system 110 can include a request handler 264, a response rewriter 266, a media encoder 268, a media address database 270, and a media content element database 272. In some implementations, each of the request handler 264, the response rewriter 266, the media encoder 268, the media address database 270, and the media content element database 272 may be instructions or other data residing on the memory 230 for execution by the processor 230. In some implementations, each of the request handler 264, the response rewriter 266, and the media encoder 268 can include at least one processing unit, server, virtual server, circuit, engine, agent, appliance, or other logic device such as programmable logic arrays configured to communicate with the media address database 270 and the media content element database 272 and with other computing devices (e.g., the content provider computing device 215, the content publisher computing device 215, or the client device 105) via the network 205.

In some implementations, the request handler 264, the response rewriter 266, and the media encoder 268 can include or execute at least one computer program or at least one script. The request handler 264, the response rewriter 266, and the media encoder 268 can be separate components, a single component, or part of the data processing system 110. The request handler 264, the response rewriter 266, and the media encoder 268 can include combinations of software and hardware, such as one or more processors (e.g., the processor 220 and the memory 230) configured to execute one or more scripts.

The data processing system 110 can also include one or more content repositories or databases, such as the media address database 270 and the media content element database 272. The databases can be local to the data processing system 110. In some implementations, the databases can be remote to the data processing system 110 but can communicate with the data processing system 110 via the network 205. The media address database 270 can include a redirect address 256' referencing an embedded media content element. The redirect address 256' may be used to redirect or forward the client agent 252 from one address to the address indicated by the media address database 270 to retrieve the embedded media content element. The redirect address 256' of the embedded media content element may have a host name corresponding to the data processing system 110. The media content element database 272 can include the embedded media content elements identified by the address. In some implementations, the embedded media content elements may be of a format prevented from auto-playing at the client device 105. Additional details of the contents of the media address database 270 and the media content element database 272 are described below.

The client device 105 can include a processor 235, an input/output (I/O) interface 245, a network interface 240, and a memory 250. The processor 235, the I/O interface 245, the network interface 240, and the memory 250 may be those detailed below in conjunction with FIG. 4 (e.g., processor 420, communication interface 405, input device 415 and input device 410, and memory 425 of the computer system 400 respectively. The memory 230 may include instructions and other data to be executed by the processor 235. The memory 230 can include a client agent 252, such as a web-browser, mobile application, or any other computing program for parsing and rendering content elements received via the network 205 at the client device 105. The client agent 252 can include a primary content element 254. The primary content element 254 can include one or more scripts such as an address 256 (e.g., an address or domain) to an embedded media content element 256", a request writer 258, a response parser 260, and a media decoder 262. The primary content 254 may initially lack the embedded media content element 256" (indicated by dotted lines in FIG. 0.2). In some implementations, the primary content element 254 may include a content element container (e.g., inline frame) for the embedded media content element 256" with the address 256 prior to loading. In some implementations, the request writer 258, the response parser 260, and the media decoder 262 may be part of the client agent 252 separate from the primary content element 254. In some implementations, the request writer 258, the response parser 260, and the media decoder 262 can be part of the container for the embedded media content element 256". In some implementations, the media decoder 262 may be provided at a time different from the provisioning of the request writer 258 and the response parser 260. The client devices 105 can include computing devices configured to communicate via the network 205 to display data such as the content provided by the content publisher computing device 215 (e.g., primary content element 254) and the content provided by the content provider computing device 215 (e.g., content elements such as the embedded media content element 256" to be embedded in the primary content element 254).

A client agent 252 executing on a client device can receive the primary content element 254 from the content publisher device 215, or another server. The primary content element 254 may be referenced by an address, such as one following the Uniform Resource Locator (URL) syntax. The address may include a domain name and a path. The domain name may be associated with or particular to the content publisher device 215. The path may refer to the particular primary content element 254 hosted by the content publisher device 215.

In addition, the client agent 252 can parse the primary content element 254 to identify additional content elements. In some implementations, the client agent 252 can identify a content element to be embedded into the primary content element 254. The client agent 252 can identify the reference for the embedded content element, such as a reference 256 to the embedded media content element 256" (e.g., HTML video or audio content element) in the primary content element 254. The address 256 for the embedded media content element 256" may include a domain name and a path name. The domain name may reference a server different from the content publisher device 215, such as the data processing system 110. The client agent 252 can determine whether the domain name of the primary content element 254 differs from the domain name of the address 256. If the domain name of the primary content element 254 does not differ from the domain name of the address 256, the client agent 252 can communicate requests and responses with the content publisher device 215 without triggering any of the restrictions specified by the CORS protocol. On the other hand, if the domain name of the primary content element 254 differs from the domain name of the address 256, future requests and responses between the client agent 252, the data processing system 110, and the content publisher device 215 may be subject to the restrictions specified by the CORS protocol.

Content in addition to the primary content element 254 may be restricted by the content agent 252. In some implementations, the client agent 252 may be configured to restrict the auto-playing of embedded media content elements of specific formats (e.g., HTML video content elements, audio content elements, and track content elements, etc.), by default. The client agent 252 may be configured to restrict the auto-playing of embedded media content elements based on a device type of the client device 105 (e.g., mobile device). In some implementations, the client agent 252 may also be configured to limit such additional content elements or the functionality thereof under the Same-Origin Policy and the CORS protocol, if the client agent 252 determines that the additional content elements are from a domain different from that of the primary content element 254. In addition, the client agent 252 may be configured to block additional content from a server that has returned a redirect response (e.g., with the 302 status code). The functionalities provided by the request rewriter 258 and the media decoder 262 may resolve both restrictions.

To retrieve the embedded content element 256", the request writer 258 executing on the client device 105 can generate an initial request 115. The initial request may include one or more headers and a body. The initial request 115 may be an HTTP request using the OPTION method or POST method, among other methods. With the OPTION method or the POST method, the request writer 258 can set an origin header of the initial request 115 to the domain name of the primary content element 254. The request writer 258 can set an host header of the initial request 115 to the address 256 of the embedded media content element 256".

The request writer 258 can include or insert a predefined identifier as a redirection indicator into the initial request 115. The predefined identifier may indicate to the data processing system 110 that the client agent 252 is configured to restrict cross-domain redirection. The predefined identifier may indicate to the data processing system 110 that the client agent 252 may be expecting another address to be redirected to. In some implementations, the request writer 258 can append the predefined identifier to the address 256 of the embedded media content element 256".

To signal to the data processing system 110 whether the client agent 252 may be expecting another address to be redirected to, the request writer 258 can set a content type header of the initial request 115 to textual (e.g., "text/plain" or "text/html", etc.). In some implementations, the request writer 258 can determine whether the initial request 115 is the first request for the embedded media content element 256" to the data processing system 110. In some implementations, the request writer 258 can maintain a counter on the memory 250 of the client device 105 to track a number of requests for the embedded media content element 256" with the corresponding address. If the counter is greater than one, in some implementations, the request writer 258 can determine that the request is not the first request to be transmitted for the embedded media content element 256". If the counter is zero, the request writer 258 can determine that the request is the first request to be transmitted for the embedded content element 256". In some implementations, the request writer 258 can compare the address 256 of the embedded media content element 256" with the address maintained by the counter. If the addresses match, the request writer 258 can identify the number of requests from the counter maintained on the memory 250. If the request writer 258 determines that the number of requests is zero or determines that the addresses do not match, in some implementations, the request writer 258 can set the content type header of the initial request 115 to textual. In some implementations, the request writer 258 can include the number of requests into the predefined identifier. The request writer 258 can then relay the generated request 115 to the client agent 252 to transmit to the data processing system 110 via the network interface 240 of the client device 105.

Once the initial request 115 is received at the data processing system 110 side, the request handler 264 can determine which type of response the client device 105 may be expecting. In some implementations, the request handler 264 can parse the initial request 115. In some implementations, the request handler 264 can identify the address of the primary content element 254 from the origin header of the initial request 115. In some implementations, the request handler 264 can identify the address 256 of the embedded media content element 256" from the host header of the initial request 115. In some implementations, the request handler 264 can extract the domain name of the primary content element 254 from the origin header of the initial request 115. In some implementations, the request handler 264 can extract the domain name of the embedded media content element 256" from the host header of the initial request 115. With the parsing of the initial request 115, the request handler 264 can compare the domain name of the primary content element 254 with the domain name of the embedded media content element 256".

If the request handler 264 determines that the domain name of the primary content element 254 does not differ from the domain name of the address 256 for the embedded content element 256", the lack of difference between the two domain names may imply that the data processing system 110 may be the same device that provided the client device 105 with the primary content element 254. As such, the requests and responses transmitted between the client device 105 and the data processing system 110 may not be subject to the restrictions specified by the CORS protocol. The request handler 264 may parse the initial request 125 for the address 256. The response rewriter 266 can use the address 256 to search for the embedded media content element 256" from the media content database 272. In some implementations, the response rewriter 266 can in turn transmit the embedded media content element 256" in the subsequent response to the client agent 252. In some implementations, the client agent 252 in turn can render and play the embedded media content element 256".

If the request handler 264 determines that the domain name of the primary content element 254 differs from the domain name of the address 256 for the embedded content element 256", the request handler 264 can determine whether the client agent 252 is configured to restrict cross-domain redirection based on the initial request 115. In some implementations, the request handler 264 can further parse the initial request 115 to identify the predefined identifier to determine whether the client agent 262 is configured to restrict cross-domain redirection. Based on identifying the predefined identifier, the request handler 264 can determine that the client agent 252 is configured to restrict cross-domain redirection. In some implementations, the request handler 264 can also determine that the client agent 252 may be expecting a redirection address 256' for the embedded media content element 256".

In some implementations, once the request handler 264 determines that the domain name of the primary content element 254 differs from the domain name of the address 256 for the embedded content element 256", the request handler 264 may access a whitelist of domain names to search for the domain name of the primary content element 254. In some implementations, the whitelist of domain names may specify which domains are permitted to be shown with the embedded content element 256". The whitelist of domain names may be maintained on the memory 230 or at a database connected to the data processing system 110. If the request handler 264 finds the domain name of the primary content element 254 on the whitelist of domain names, the request handler 264 may continue parsing the request (e.g., the initial request 115) in the manner detailed herein. If the request handler 264 does not find the domain name of primary content element 254 on the whitelist of domain names, the request handler 264 may prohibit the embedded media content element 256" to be provided to the client device 105 and may terminate further processing of the request. In this manner, security of the client agent 252 executing on the client device 105 may be maintained, while allowing the client agent 252 to access content from certain domains different from those of the primary content element 254.

In some implementations, the request handler 264 can parse the initial request 115 to identify an application profile of the client agent 252 (e.g., which type of web browser) to determine whether the client agent 252 is configured to restrict cross-domain redirection. The request handler 264 can compare the application profile of the client agent 262 to a list of applications configured to restrict cross-domain redirection. The list of applications may be accessed by the request handler 264 from the memory 230 or another database connected to the data processing system 110. If the application profile of the client agent 252 matches one of the applications of the list of applications, the request handler 264 can determine that the client agent 252 is configured to restrict cross-domain redirection. The request handler 264 can also determine that the client agent 252 may be expecting a redirection address 256' for the embedded media content element 256". If the application profile of the client agent 252 does not match any of the applications on the list of applications, the request handler 264 can determine that the client agent 252 is not configured to restrict cross-domain redirection.

In some implementations, the request handler 264 can parse the initial request 115 to identify a device type of the client device 105 (e.g., whether the client device 105 is a smart phone, laptop, or desktop, etc.) in determining whether the client agent 252 is configured to restrict cross-domain redirection. The request handler 264 can compare the device type of the client device 105 to a list of device types configured to restrict cross-domain redirection. The list of device types may be accessed by the request handler 264 from the memory 230 or another database connected to the data processing system 110. If the device type of the client device 105 matches one of the device types of the list of device types, the request handler 264 can determine that the client agent 252 configured to restrict cross-domain redirection. The request handler 264 can also determine that the client agent 252 may be expecting a redirection address 256' for the embedded media content element 256". If the device type of the client device 105 does not match any of the device types on the list of device types, the request handler 264 can determine that the client agent 252 is not configured to restrict cross-domain redirection.

If the request handler 264 determines that the client agent 252 is not configured to restrict cross-domain redirection, the request handler 264 can parse the initial request 125 for the address 256. The response rewriter 266 can use the address 256 to search for the embedded media content element 256" from the media content database 272. The response rewriter 266 can in turn transmit the embedded media content element 256" included in the subsequent response to the client agent 252. The client agent 252 in turn can render and play the embedded media content element 256".

If the request handler 264 determines that the client agent 252 is configured to restrict cross-domain redirection and/or that the client agent 252 may be expecting a redirection address 256', the request handler 264 can determine which type of response the client agent 252 may be expecting based on the content type header of the received request (e.g., the initial request 115 or terminal request 135). In some implementations, the request handler 264 can parse the initial request 115 to identify the content type header. The content type header may indicate which type of content in the body of the response the client agent 252 may be expecting. As explained above, the content type header may specify textual or non-textual content. If the request handler 264 identifies that the content type header of the request specifies textual (such as the case with the initial request 115), the request handler 264 can determine that the client agent 252 may be expecting the redirect address 256' for the embedded media content element 256". In some implementations, the request handler 264 can determine which type of method the initial request 115 corresponds to (e.g., OPTION or POST) to identify which type of response the client agent 252 may be expecting. If the method of the initial request is OPTION (e.g., a preflight request under CORS), the request handler 264 may determine that the client agent 252 may be expecting the redirect address 256' for the embedded media content element. The operation of the request handler 264 in response to identifying the content type header of the request as non-textual (such as the case with the terminal request 135) is described in more detail below.

Once the request handler 264 identifies the content type header of the request as specifying textual content (e.g., initial header 115), the request handler 264 can relay, signal, or otherwise cause the response rewriter 266 to generate the initial response 125 to counteract the restriction of cross-domain redirection. Under the CORS specification, if the data processing 110 were to attempt to issue a response with a redirect status code including an address for embedded content with a domain different from that of the primary content element 254, the origin header of the response may be set to null, thereby restricting all domains in the redirect response. The redirect status code may include 301 multiple choices, 301 moved permanently, 302 found, 303 see other, 304 not modified, 305 use proxy, 307 temporary redirect, or 308 permanent redirect. To bypass the restrictions of the CORS specification concerning responses with a redirect status code, the response rewriter 266 can generate a response lacking such a redirect status code.

In some implementations, the response rewriter 266 can generate the initial response 125. The response rewriter 266 can set a header and a body of the initial response 125. The header of the initial response 125 can be set to include a status code indicating success (e.g., 200 OK). In some implementations, the header of the initial response 125 can be set to include a content type header indicating textual (e.g., "text/plain," and "text/html", among others). To set the body of the initial response 125, the response rewriter 266 can access the media address database 270 to search for the redirect address 256' corresponding to the address 256 for the embedded content element 256". The redirect address 256' may be used by the client agent 252 to issue and transmit another request to the data processing system 110 for the embedded content element 256". Once the redirect address 256' is identified, the response rewriter 266 can set, insert, or write the redirect address 256' into the body of the initial response 125. The response rewriter 266 can transmit the initial response 125 via the network interface 225 to the client device 105. Receipt of the initial response 125 may cause the client agent 252 to extract the redirect address 256' from the initial response 125 and to transmit another request with the redirect address 256'.

In some implementations, the response rewriter 266 can identify the number of requests in the request from the client agent 252, as the received request may be part of a chain of requests and responses for the embedded media content element 256". In some implementations, the response rewriter 266 can maintain a counter on the memory 230 or at on a database connected to the response rewriter 266 to track the number of redirects for the embedded media content element 256" for the client agent 252. In response to receiving the request, the response rewriter 266 can update or increment the counter for the number of redirects. In some implementations, the response rewriter 266 can include the number of redirects in the response. In some implementations, the number of redirects may be appended to the redirect address 256' (e.g., at the end of the URL for the redirect address 256'). In some implementations, the response rewriter 266 can compare the number of redirects to a maximum number of redirects. If the response rewriter 266 determines that the number of redirects is greater than or equal to the maximum number of redirects, the response rewriter 266 can set the response to indicate failure to retrieve content (e.g., using a 5xx error code). If the response rewriter 266 determines that the number of redirects is less than the maximum number of redirects, the response rewriter 266 access the media access database 270 to search for the redirect address 256' and insert the redirect address 256' into the body of the response. In some implementations, the response rewriter 266 can further transmit the response with the number of redirects via the network interface 225 to the client device 105.

In response to receiving the response with the redirect address 256' (e.g., initial response 125) from the data processing system 110 at the client device 105, the response parser 260 can parse the response. As the response may include a status code indicating success (e.g., 200 OK) as opposed to redirect (e.g., 302 found), the client agent 252 may be free from the restrictions specified by the CORS protocol and may access the content of a domain different form that of the primary content element 252 in the redirect chain. The response parser 260 can parse the initial response 125 (or another response) to extract the body of the initial response 125. The response parser 260 can determine whether the body of the initial response 125 includes the redirect address 256' or another type of content, such as the embedded media content element 256" as will be discussed later herein. The response parser 260 can parse the initial response 125 to extract or otherwise identify the redirect address 256'. In some implementations, the response parser 260 can parse the initial response 125 to identify the status code indicating success. In response to identifying the status code indicating success, the response parser 260 can extract the redirect address 256' from the initial response 125. In some implementations, the response parser 260 can parse the initial response 125 to identify the content type header. If the content type header of the initial response 125 indicates textual, the response parser 260 can extract the redirect address 256' from the initial response 125. In some implementations, the response parser 260 can relay the redirect address 256' to the request writer 258.

With the redirect address 256' parsed from the initial response 125, the request writer 258 may generate a request (e.g., the terminal request 135). The terminal request 135 may include one or more headers and a body. The terminal request 135 may be an HTTP request using the POST or GET method, among other methods. With the POST or GET method, the request writer 258 can set an origin header of the terminal request 135 to the domain name of the primary content element 254. The request writer 258 can set an host header of the terminal request 135 to the redirect address 256' for the embedded media content element 256" received from the data processing system 110.

To signal to the data processing system 110 whether the client agent 252 is expecting the embedded media content element 256", the request writer 258 can set a content type header of the terminal request 135 to non-textual (e.g., application, video, JSON, etc.). The request writer 258 can include or insert a predefined identifier as a redirection indicator into the terminal request 135. The predefined identifier may indicate to the data processing system 110 that the client agent 252 is configured to restrict cross-domain redirection. In some implementations, the request writer 258 can append the predefined identifier to the redirect address 256' of the embedded media content element 256". In some embodiments, the request writer 258 can update or increment the counter for keeping track of the number of requests for the embedded content element 256". The request writer 268 can include the number of requests into the terminal request 135. In some implementations, the request writer 268 can append the number of requests onto the redirect address 256' in the host header. The request writer 258 can then relay the generated request 125 to the client agent 252 to transmit to the data processing system 110 via the network interface 240 of the client device 105.

Once the terminal request 135 (or request subsequent to the initial request 115) is received at the data processing system 110 side, the request handler 264 can again determine which type of response the client device 105. The request handler 264 can parse the terminal request 135. The request handler 264 can identify the address of the primary content element 254 from the origin header of the terminal request 135. The request handler 264 can identify the redirect address 256' for the embedded media content element 256" from the host header of the terminal request 135. In some implementations, the request handler 264 can extract the domain name of the primary content element 254 from the origin header of the terminal request 135. In some implementations, the request handler 264 can extract the domain name of the embedded media content element 256" from the host header of the terminal request 135. With the parsing of the terminal request 135, the request handler 264 can compare the domain name of the primary content element 254 with the domain name of the embedded media content element 256".

If the request handler 264 determines that the domain name of the primary content element 254 does not differ from the domain name of the address 256 for the embedded content element 256", the lack of difference between the two domain names may imply that the data processing system 110 may be the same device that provided the client device 105 with the primary content element 254. As such, the requests and responses transmitted between the client device 105 and the data processing system 110 may not be subject to the restrictions specified by the CORS protocol. The request handler 264 may parse the initial request 125 for the address 256. The response rewriter 266 can use the address 256 to search for the embedded media content element 256" from the media content database 272. The response rewriter 266 can in turn transmit the embedded media content element 256" in the subsequent response to the client agent 252. The client agent 252 in turn can render and play the embedded media content element 256".

Using the terminal request 135, the request handler 264 can determine whether the client agent 252 is configured to restrict cross-domain redirection. In some implementations, the request handler 264 can further parse the terminal request 135 to identify the predefined identifier to determine whether the client agent 262 is configured to restrict cross-domain redirection. Based on identifying the predefined identifier, the request handler 264 can determine that the client agent 252 is configured to restrict cross-domain redirection. The request handler 264 can further determine that the client agent 252 may be expecting the embedded media content element 256" from other data included in the terminal request 135.

In some implementations, the request handler 264 can parse the terminal request 135 to identify an application profile of the client agent 252 (e.g., which type of web browser) to determine whether the client agent 252 is configured to restrict cross-domain redirection. The request handler 264 can compare the application profile of the client agent 262 to a list of applications configured to restrict cross-domain redirection. In some implementations, the list of applications may be accessed by the request handler 264 from the memory 230 or another database connected to the data processing system 110. If the application profile of the client agent 252 matches one of the applications of the list of applications, the request handler 264 can determine that the agent 252 is configured to restrict cross-domain redirection. In some implementations, the request handler 264 can also determine that the client agent 252 may be expecting the embedded media content element 256". If the application profile of the client agent 252 does not match any of the applications on the list of applications, the request handler 264 can determine that the client agent 252 is not configured to restrict cross-domain redirection.

In some implementations, the request handler 264 can parse the terminal request 135 to identify a device type of the client device 105 (e.g., whether the client device 105 is a smart phone, laptop, or desktop, etc.) in determining whether the client agent 252 is configured to restrict cross-domain redirection. In some implementations, the request handler 264 can compare the device type of the client device 105 to a list of device types configured to restrict cross-domain redirection. In some implementations, the list of device types may be accessed by the request handler 264 from the memory 230 or another database connected to the data processing system 110. If the device type of the client device 105 matches one of the device types of the list of device types, the request handler 264 can determine that the client agent 252 configured to restrict cross-domain redirection. In some implementations, the request handler 264 can also determine that the client agent 252 may be expecting the embedded media content element 256". If the device type of the client device 105 does not match any of the device types on the list of device types, the request handler 264 can determine that the client agent 252 is not configured to restrict cross-domain redirection.

If the request handler 264 determines that the client agent 252 is configured to restrict cross-domain redirection, the request handler 264 can determine which type of response the client agent 252 may be expecting based on the content type header of the received request. In some implementations, the request handler 264 can parse the terminal request 135 to identify the content type header. In some implementations, the content type header may indicate which type of content in the body of the response the client agent 252 may be expecting. As explained above, the content type header may specify textual or non-textual content. If the request handler 264 identifies that the content type header of the request specifies non-textual (such as the case with the terminal request 135), the request handler 264 can determine that the client agent 252 may be expecting the embedded media content element 256". In some implementations, the request handler 264 can determine which type of method the initial request 115 corresponds to (e.g., OPTION, POST, or GET) to identify which type of response the client agent 252 may be expecting. If the method of the initial request is GET or POST, the request handler 264 may determine that the client agent 252 may be expecting the embedded media content element. The operation of the request handler 264 in response to identifying the content type header of the request as textual (such as the case with the initial request 115) is described in more detail above.

Once the request handler 264 identifies the content type header of the request as specifying non-textual content, the request handler 264 can relay, signal, or otherwise cause the response rewriter 266 to generate the terminal response 145 to provide the client agent 252 with the embedded media content element 256" corresponding to the redirect address 256'. The response rewriter 266 can set a header and a body of the terminal response 145. The header of the terminal response 145 can be set to include a status code success (e.g., 200 OK). The header of the terminal response 145 can be set to include a content type header indicating non-textual. To set the body of the initial response 125, the response rewriter 266 can access the media content database 272 to search for the embedded media content element 256" using the redirect address 256'. The embedded media content element 256" may be used by the client agent 252 to render for the display on a display connected to the client device 105. Once the embedded media content element 256" is identified, the response rewriter 266 can set, insert, or write the embedded media content element 256" into the body of the terminal response 145. The response rewriter 266 can transmit the terminal response 145 via the network interface 225 to the client device 105.

In some implementations, the response rewriter 266 can include or insert executable code (e.g., for the media decoder 262) into the body of the terminal response 145 for instantiating a media player (e.g., using FLASH or JAVASCRIPT) to render and play the embedded media content element 256". Once executed at the client device 105, the executable code in the terminal response 145 may convert the embedded media content element 256" from first format (e.g., HTML video content element) to a second format (e.g., JAVASCRIPT or HTML canvas content element). In some implementations, the client device 105 or the client agent 252 may be configured to restrict or prohibit auto-playing of the embedded media content element 256" in the first format without authorization (e.g., interaction with the embedded media content element 256"). On the other hand, the client device 105 or the client agent 252 may be configured to permit auto-playing of the embedded media content element 256" in the second format (e.g., without user interaction with the embedded media content element 256"). In this manner, the terminal response 145 may circumvent restrictions specified by the client agent 252 on certain formatting of media content, thereby improving the human-computer interaction (HCI) with the content elements embedded in the primary content element 254 rendered at the client device 105. The response rewriter 266 can transmit the terminal response 145 with the executable code via the network interface 225 to the client device 105.

The media encoder 268 can encode the embedded media content element 256" prior to providing the embedded media content element 256" to the client agent 252. The media encoder 268 can convert the embedded media content element 256" from a first format (e.g., HTML video content element) to a second format (e.g., JAVASCRIPT or HTML canvas content element). In some implementations, the client device 105 or the client agent 252 may be configured to restrict or prohibit auto-playing of the embedded media content element 256" in the first format without authorization (e.g., interaction with the embedded media content element 256"). On the other hand, the client device 105 or the client agent 252 may be configured to permit auto-playing of the embedded media content element 256" in the second format (e.g., without user interaction the embedded media content element 256").

Using various image processing algorithms, the media encoder 268 can traverse the embedded video media content element 256" encoded in the first format (e.g., HTML video content element) frame by frame to identify one or more image objects in the frame. For each identified image object at each frame, the media encoder 268 can then identify a corresponding one or more drawing functions to construct the embedded media content element 256" in the second format (e.g., JAVASCRIPT for invoking HTML drawing functions for graphics in an HTML canvas content element, such as rect( ), fill( ), lineTo( ), and translate( ) functions, etc.). By arranging the drawing functions, the media encoder 268 can generate the embedded video media content element 256" encoded in the second format. The media encoder 268 may transcode audio from the embedded video content element 256" encoded in the first format into the second format. In some implementations, the media encoder 268 may include a separate audio content element to be provided with the embedded video media content element 256".

Once converted, the media encoder 268 can relay the embedded media content element 256" encoded in the second format to the response rewriter 266. In some implementations, the response rewriter 266 can in turn insert or include the embedded media content element 256" encoded in the second format into the terminal response 145. In some implementations, the response rewriter 266 can transmit the terminal response 145 with the embedded media content element 256" encoded in the second format via the network interface 225 to the client device 105.

In determining whether to further encode the embedded content element 256", the response rewriter 266 can determine whether the client device 105 (e.g., mobile smartphones) or the client agent 252 (e.g., web browser for smart phones) is configured to restrict auto playing of the embedded media content element 256" encoded in the first format (e.g., HTML video content element). The response rewriter 266 can determine whether the client device 105 or the client agent 252 is configured to restrict the auto playing of the embedded media content element 256" when encoded in the first format based on the request (e.g., terminal request 135). The media encoder 268 in conjunction can encode the embedded media content element 256" to another format that the client device 105 or the client agent 252 is configured to permit auto playing.

In some implementations, the response rewriter 266 can parse the terminal request 135 to identify a device type identifier of the client device 105. The response rewriter 266 can compare the device type of the client device 105 to a list of device types configured to restrict auto playing of the embedded media content element 256" in the first format. If the device type of the client device 105 matches one of the device types of the list of device types, the response rewriter 266 can determine that the client device 105 is configured to restrict auto playing of the embedded media content element 256" in the first format. In some implementations, the media encoder 268 can encode or convert the embedded media content element 256" from the first format to the second format. In some implementations, the response rewriter 266 can transmit the terminal response 145 with the embedded media content element 256" encoded in the second format via the network interface 225 to the client device 105. If the device type of the client device 105 does not match any of the device types of the list of device types, the response rewriter 266 can determine that the client device 105 is configured to permit auto playing of the embedded media content element 256" in the first format.

In some implementations, the response rewriter 266 can parse the terminal request 135 to identify an application profile of the client agent 252. The response rewriter 266 can compare the application profile of the client agent 252 to a list of applications configured to restrict auto playing of the embedded media content element 256" in the first format. If the application profile of the client agent 252 matches one of the applications of the list of applications, the response rewriter 266 can determine that the client agent 252 is configured to restrict auto playing of the embedded media content element 256" in the first format. The media encoder 268 can encode, transcode, or otherwise convert the embedded media content element 256" from the first format to the second format. The response rewriter 266 can transmit the terminal response 145 with the embedded media content element 256" encoded in the second format via the network interface 225 to the client device 105. If the application profile of the client agent 252 does not matches any of the applications of the list of applications, the response rewriter 266 can determine that the client agent 252 is configured to permit auto playing of the embedded media content element 256" in the first format.

In response to receipt of the terminal response 145 by the client agent 252, the response parser 260 can parse the terminal response 145 to extract the embedded media content element 256" from the body. The response parser 260 can determine whether the body of the terminal response 145 includes the embedded media content element 256" or the redirect address 256' as discussed above. In some implementations, the response parser 260 can parse the terminal response 145 to identify the status code indicating success. In response to identifying the status code indicating success, the response parser 260 can extract the embedded media content element 256" from the terminal response 145. In some implementations, the response parser 260 can parse the terminal response 145 to identify the content type header. If the content type header of the terminal response 145 indicates non-textual, the response parser 260 can determine that the body includes the embedded media content element 256" and extract the embedded media content element 256". The response parser 260 can relay the embedded media content element 256" to the media decoder 262.

In some implementations, the response parser 260 can parse the terminal response 145 to further identify executable code in the body for instantiating the media player to render and play the embedded media content element 256". The media player may have similar or the same functionality as the media decoder 262, and may include instructions for the client agent 252 to convert the embedded media content element 256" from the first format to the second format. The first format may be restricted from automatic playback by the client agent 252, whereas the second format may be permitted to automatically play by the client agent 252. Once identified, the response parser 260 can extract the executable code from the body of the terminal response 145. The response parser 260 can in turn cause the client agent 252 to execute the media player to play and render the embedded media content element 256".

With the embedded media content element 256" extracted from the terminal response 145, the media decoder 262 can play and render the embedded media content element 256" on the client device 105. In some implementations, the media decoder 262 may be a media player configured to play video content (e.g., HTML video content elements) of the client agent 252. In some implementations, the media decoder 262 may be a script executable by the processor 235 of the client device 250 provided with the primary content element 254. In some implementations, the media decoder 262 may be a script executable by the processor 235 of the client device 250 of the embedded media content element 256" provided by the data processing system 110.

In some implementations, the response parser 260 can parse the terminal response 145 to further determine whether the embedded media content element 256" is encoded in the first format or in the second format. The first format may be restricted from automatic playback by the client agent 252, whereas the second format may be permitted to automatically play by the client agent 252. If the response parser 260 determines that the embedded media content element 256" is encoded in the second format, the media decoder 262 or the client agent 252 can play and render the embedded media content element 256" without any restrictions.

If the response parser 260 determines that the embedded media content element 256" is encoded in the first format, the response parser 260 may signal or relay to the media decoder 262 or the client agent 252 to convert the embedded media content element 256 to the second format. Using various image processing algorithms, the media decoder 262 can traverse the embedded video media content element 256" encoded in the first format (e.g., HTML video content element) frame by frame to identify one or more image object on the frame. For each identified image object at each frame, the media encoder 268 can then identify a corresponding one or more drawing functions to construct the embedded media content element 256" in the second format (e.g., JAVASCRIPT for invoking HTML drawing functions for graphics in an HTML canvas content element, such as rect( ), fill( ), lineTo( ), and translate( ) functions, etc.). By arranging the drawing functions, the decoder 262 can generate the embedded video media content element 256" encoded in the second format to allow the client agent 252 to auto-play.

Figure 3A:
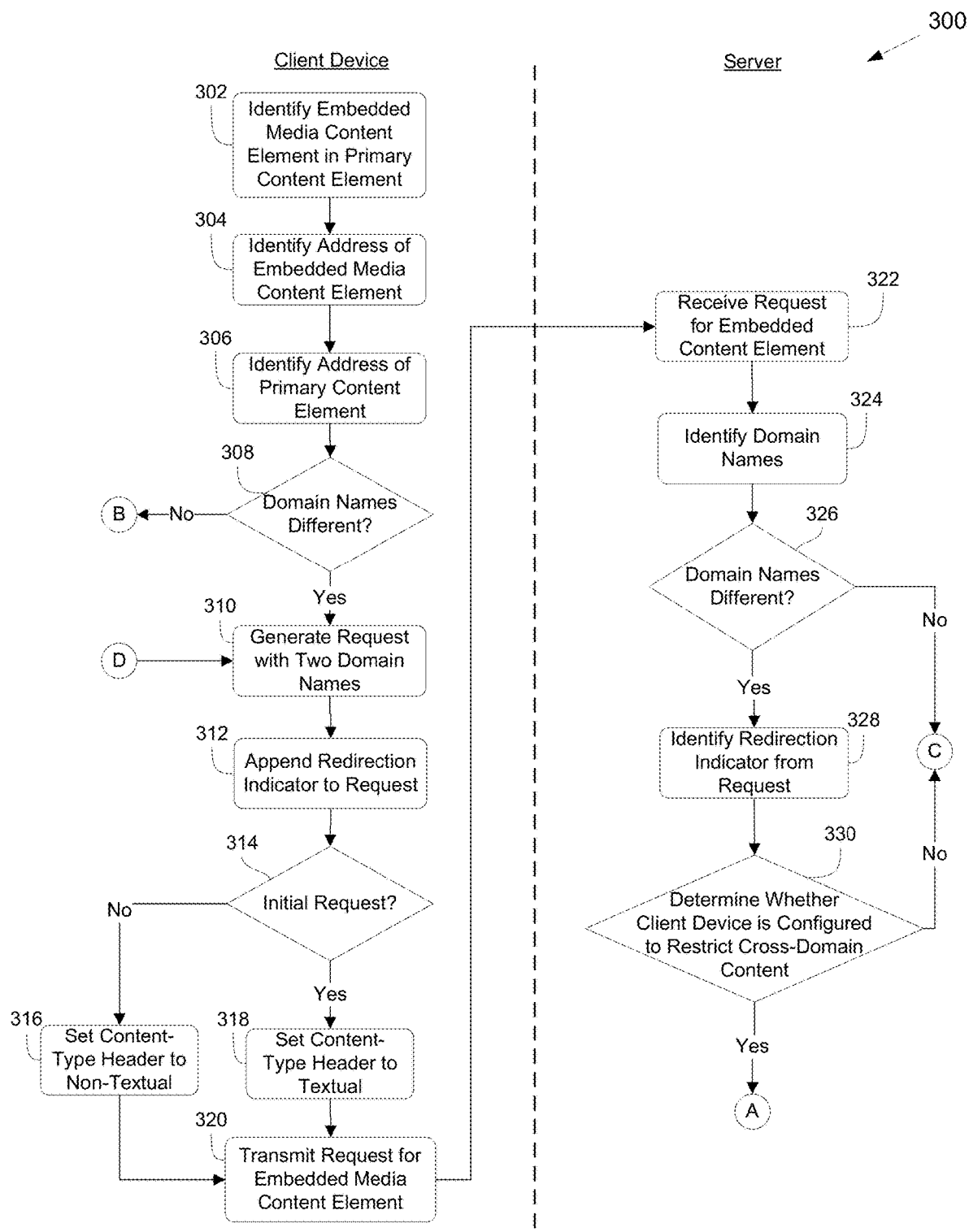
FIGS. 3A-3C are flow diagrams depicting a method of delivering cross-site auto-play media, according to an illustrative implementation.
Figure 3B:
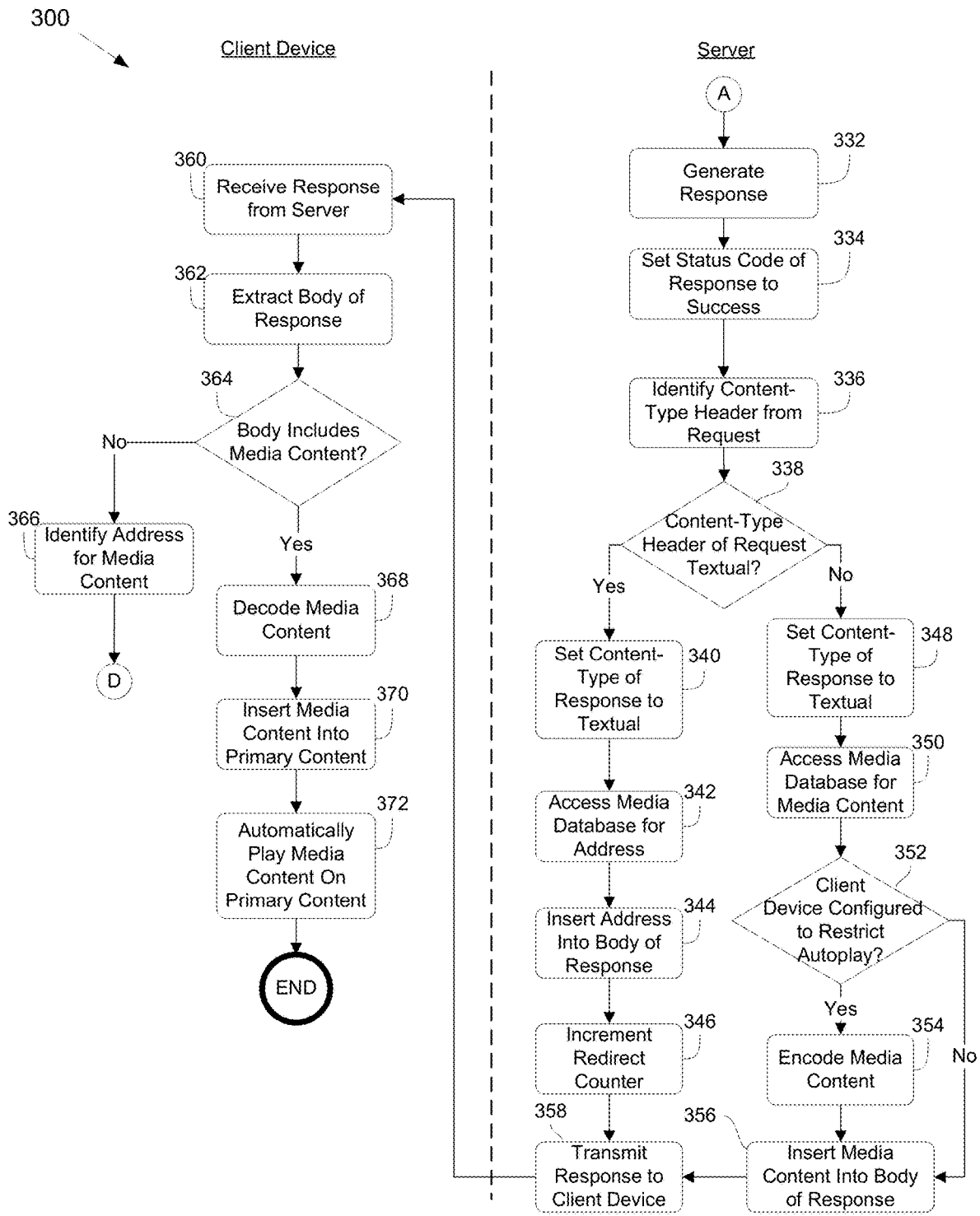
Figure 3C:
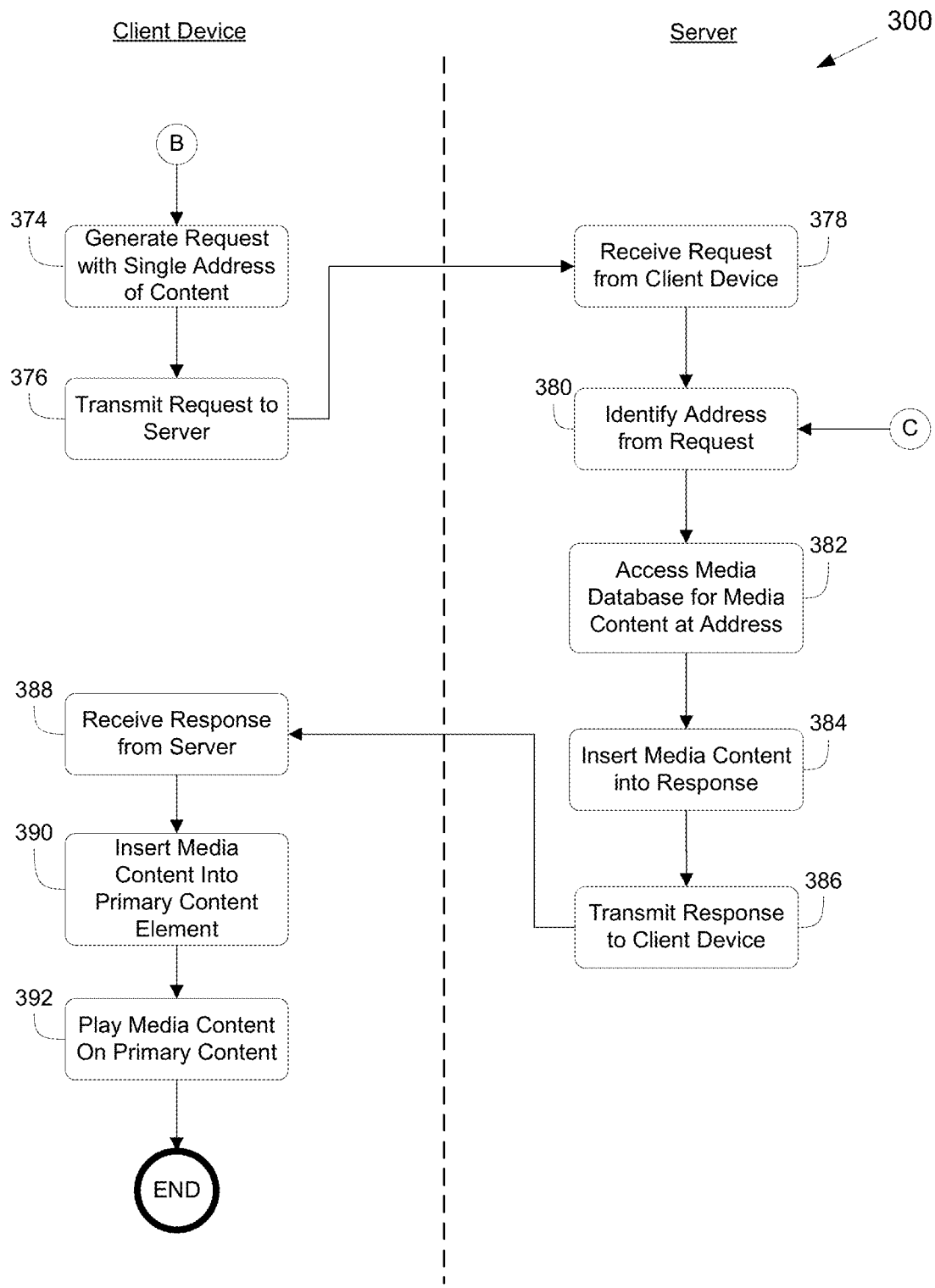
Figure 4:
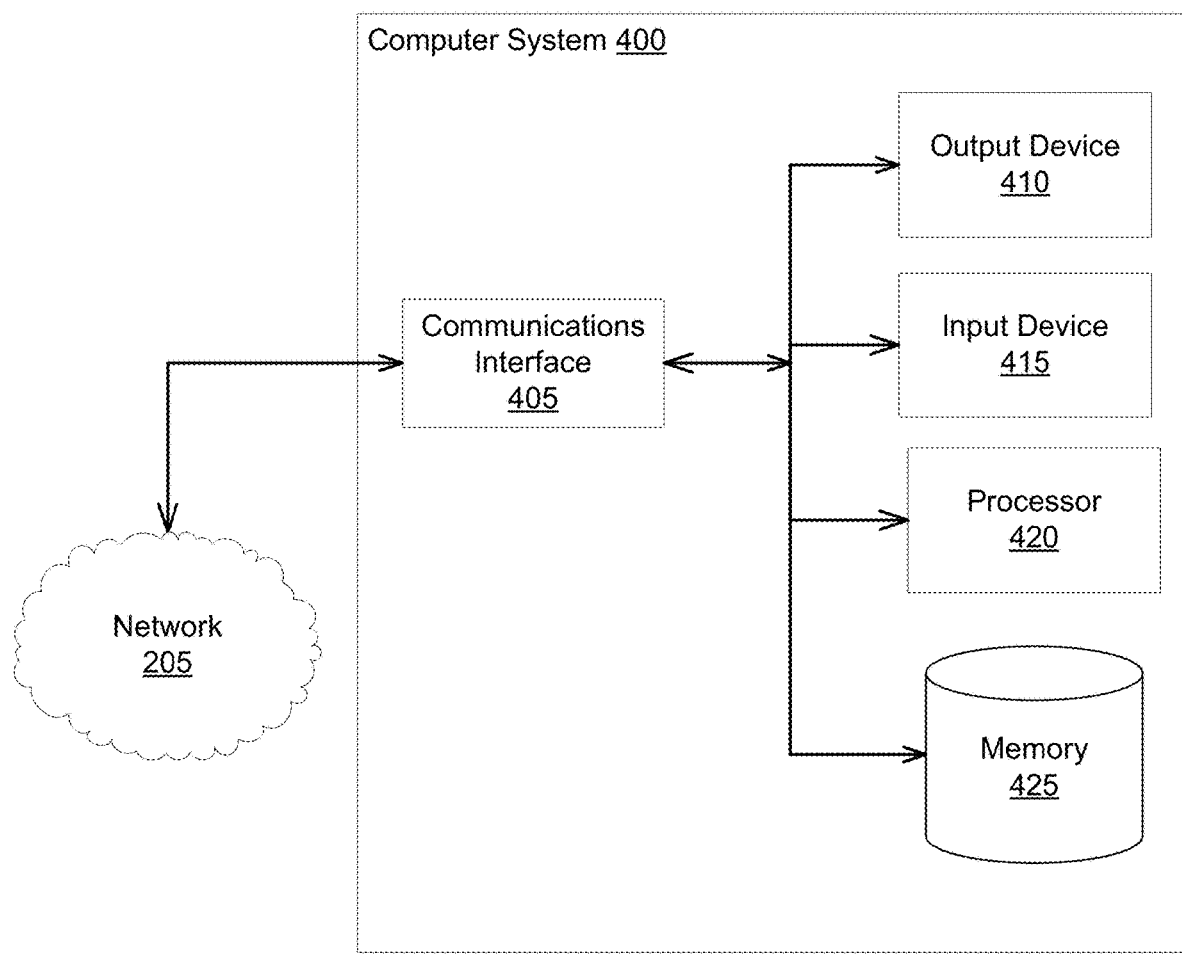
FIG. 4 is a block diagram illustrating a general architecture for a computer system that may be employed to implement elements of the systems and methods described and illustrated herein, according to an illustrative implementation.

Referring to FIGS. 3A-3C, illustrated is a flow diagram depicting a method 300 of delivering cross-site auto-play media. The functionality described herein with respect to method 300 may be performed or executed by the system 200, such as the data processing system 110, the client device 105, the content provider device 210, and the content publisher device 215 as shown on FIG. 2 or the system 400 as shown in FIG. 4, among others, or any combination thereof.

Starting from FIG. 3A, the client device can identify embedded media content element in a primary content element (Step 302). The primary content element may have been received by the client device, and may initially lack the embedded media content element. The primary content element may include an address to the embedded media content element. In some implementations, primary content element may include an inline frame (e.g., a content slot) for embedding the media content element.

In some implementations, the client device can identify an address of the embedded media content element (Step 304). The address for the embedded media content element may include a domain name and a path name. The domain name for the embedded media content element may reference a server different from the content publisher device that provided the primary content element.

The client device can identify an address of the primary content element (Step 306). The primary content element may be referenced by an address, such as one following the Uniform Resource Locator (URL) syntax. The address may include a domain name and a path. The domain name may be associated with or particular to the content publisher device. The path may refer to the particular primary content element hosted by the content publisher device.

The client device can determine whether the domain name of the embedded media content element differs from the domain name of the primary content element (Step 308). If the domain name of the embedded media content element does not differ from the domain name of the primary content element, the client device may execute the functionality at Step 374 discussed below. In such a scenario, the lack of difference between domain names may indicate that the primary content element and the embedded media content element are to be provided by the same server. Communications between the client device and the server as such may be free from the restrictions specified by the CORS protocol.

On the other hand, if the domain name of the embedded media content element differs from the domain name of the primary content element, the client device can generate a request with the two domain names (Step 310). The request may be an HTTP request using the OPTION, POST, GET, or HEAD method. An origin header of the request may be set to the address of the primary content element. A host header of the request may be set to the address of the embedded content element. In addition, the client device can append a redirection indicator to the generated request (Step 312). The redirection indicator may signal the server that the client device is configured to restrict cross-domain content and may also indicate to the server that the client device may be expecting another address to be redirected to. In some implementations, the client device can insert the redirection indicator to the address of the embedded content element in the host header of the request.

The client device can determine whether the request to be sent is the initial request (Step 314). In some implementations, the client device can maintain a counter on the memory to track a number of requests for the embedded media content element. If the counter is greater than one, the client device can determine that the request to be sent is not the first request. As the request is not the first to be sent, the client device can set a content type header of the request to non-textual (Step 316). Setting the content type header to non-textual may indicate to the server that the client device is expecting the embedded media content element. If the counter is zero, the client device can determine that the request to be sent is the first request. As the request is the first to be sent, the client device can set the content type header of the request to textual (Step 318). Setting the content type header to textual may indicate to the server that the client device is expecting a redirect address for the embedded media content element. The client device can transmit the request for the embedded media content element to the server (Step 320).

The server can receive the request for the embedded media content element (Step 322). The server can identify the domain name of the primary content element and the domain name of the embedded media content element included in the request (Step 324). The server can identify the address of the primary content element from the origin header of the request. The server can extract the domain name from the address of the primary content element. The server can identify the address of the embedded media content element from the host header of the request. The server can extract the domain name from the address of the embedded media content element.

The server can determine whether the domain name of the primary content element differs from the domain name of the embedded media content element (Step 326). If the two domain names do not differ from each other, the server can proceed to execute the functionality of Step 380 described below. On the other hand, if the two domain names differ from each other, the server can identify the redirection indicator included in the request (Step 328). The server can determine whether the client device is configured to restrict cross-domain content (Step 330). In some implementations, using the request, the server can determine whether the client device is expecting a redirection address or the embedded media content element inserted into the body of the response. If the client device is not configured to restrict cross-domain content, the server can proceed to execute the functionality of Step 380 described below.

Referring now to FIG. 3B, if the client device is configured to restrict cross-domain content, the server can generate a response (Step 332). The server can set the status code of the response to success (Step 334). Under the CORS specification, if the server were to attempt to issue a response with a redirect status code including an address for embedded content with a domain different from that of the primary content element, the origin header of the response may be set to null, thereby restricting all domains in the redirect response. By setting the status code of the response to success, the server may bypass the restrictions placed by the CORS specification on responses with redirect status codes. The server can identify the content type header from the request (Step 336). The content type header may indicate which type of data to include into the response to be sent to the client device.

If the content type header of the request indicates textual, the server can set the content type header of the response to textual (Step 340). Setting the content type header of the response to textual may indicate to the client device that the body of the response includes a redirect address for the embedded media content element. In some implementations, the server can access the media database for the redirect address for the embedded media content element (Step 342). In some implementations, the server can insert the redirect address into the body of the response (Step 344). In some implementations, the server can increment a redirect counter (Step 346). The server can maintain a counter on the memory to track the number of redirects for the embedded media content element for the client device. The server can insert the number of redirects to the response. The server can then transmit the response to the client device (Step 358).

If the content type header of the request indicates non-textual, the server can set the content type header of the response to non-textual (Step 348). The server can access the media database for the embedded media content element (Step 350). The server can determine whether the client device is configured to restrict auto playing of the media content (Step 352). The client device may be configured to restrict auto-playing of the embedded media content element if encoded in one format (e.g., HTML video content element), but permit auto-playing if encoded in another format (e.g., HTML canvas content element). If the client device is configured to restrict auto playing, the server can encode the embedded media content element (Step 354). The server can convert the encoding of the embedded media content element (e.g., using various image processing algorithms) from one format to another format. The server can insert the embedded media content element into the body of the response (Step 356). The server can then transmit the response to the client device (Step 358).

The client device can receive the response from the server (Step 360). The client device can extract the body of the response (Step 362). The client device can determine whether the body of the response includes the redirect address or the embedded media content element (Step 364). In some implementations, the client device can determine a type of data included in the body of the response based on the content type header of the response.

If the body includes the redirect address for the embedded media content element, the client device can identify the redirect address (Step 366). In some implementations, if the content type header indicates textual, the client device may determine that the body includes the redirect address for the embedded media content element. The client device may then re-execute the functionality of Step 310 as described herein, using the redirect address provided by the server as the host header of the next request.

If the body includes the embedded media content element, the client device can decode the embedded media content element (Step 368). In some implementations, if the content type header indicates non-textual, the client device may determine that the body includes the embedded media content element. The client device can insert the embedded media content element onto the primary content element (Step 370). In some implementations, the client device may decode the embedded media content element from one format to another format. The former format may be restricted by the client device from auto-play, whereas the latter format may be permitted by the client device to auto-play. The client device can then automatically play and render the embedded media content element on the primary content element (Step 372).

Referring now to FIG. 3C, if the domain name of the primary content element does not differ from the domain name of the embedded media content element, the client device can generate a request with the single address (Step 374). The lack of difference between the domain name of the primary content element and the domain name of the embedded media content element may imply that the server may be the same device that provided the client device with the primary content element. From Step 374 onward, communications between the client device and the server may be free from the restrictions specified by the CORS protocol. The client device can set an origin header of the request to the address of the primary content element. The client device can set a host header of the request to the address of the embedded media content element.

The client device can then transmit the request to the server (Step 376). The server can receive the request from the client device (Step 378). The server can identify the address from the request for the embedded media content element (Step 380). The server can parse the request to identify the address in the host header of the request. The server can access the media database for media content at the address (Step 382). The server can insert the embedded media content element into the response (Step 384). The server can transmit the response to the client device (Step 386). The client device can receive the response from the server (Step 388). The client device can insert the embedded media content element into the primary content element (Step 390). The client device can play and render the embedded media content element into the primary content element (Step 392).

FIG. 4 shows the general architecture of an illustrative computer system 400 that may be employed to implement any of the computer systems discussed herein (including the data processing system 110 and its components such as the request handler 264, the response rewriter 266, and the media encoder 268 and the client device 105 and its components such as the client agent 252, the primary content element 254, the request writer 258, the response parser 260, and the media decoder 262) in accordance with some implementations. The computer system 400 can be used to provide information via the network 205 for display. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the data processing system 110 such as the request handler 264, the response rewriter 266, and the media encoder 268 and the client device 105 and its components such as the client agent 252, the primary content element 254, the request writer 258, the response parser 260, and the media decoder 262 among others.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 425 to store information related to the availability of inventory of one or more content units, reservations of one or more content units, among others. The memory 425 can include the database 140. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. In some implementations, the communications interface(s) 405 may be coupled to a wired or wireless network, bus, or other communication means and may therefore allow the computer system 400 to transmit information to or receive information from other devices (e.g., other computer systems). While not shown explicitly in the system of FIG. 2, one or more communications interfaces facilitate information flow between the components of the system 400. In some implementations, the communications interface(s) may be configured (e.g., via various hardware components or software components) to provide a website as an access portal to at least some aspects of the computer system 400. The communications interfaces 405 may include user interfaces (e.g., web pages), through which the user can communicate with the data processing system 110.

The output devices 410 of the computer system 400 shown in FIG. 4 may be provided to allow various information to be viewed or otherwise perceived in connection with execution of the instructions. In some implementations, the input device(s) 415 may be provided to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including a programmable processor, a computer, a system on a chip, or multiple ones, or combinations, of the foregoing, among others. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The request handler 264, the response rewriter 266, and the media encoder 268 can include or share one or more data processing apparatuses, computing devices, or processors. The client agent 252, the primary content element 254, the request writer 258, the response parser 260, and the media decoder 262 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program may include, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) FLASH drive). Devices suitable for storing computer program instructions and data include all forms of non-volatile memory, media and memory devices, including semiconductor memory devices such as EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, such as by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks can include a local area network ("LAN") and a wide area network ("WAN"), an inter-network (e.g., the Internet), and peer-to-peer networks (e.g., ad hoc peer-to-peer networks).

The computing system such as system 400 or system 110 can include clients and servers. In some implementations, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. In some implementations, the request handler 264, the response rewriter 266, and the media encoder 268 can be part of the data processing system 110, a single module, a logic device having one or more processing modules, one or more servers, or part of a search engine. In some implementations, the client agent 252, the primary content element 254, the request writer 258, the response parser 260, the media decoder 262 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to delivering cross-site auto-play media, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of delivering cross-site content, comprising:
receiving, by a data processing system, from a client device, a first request for a content element at a first domain to insert in a content slot from a second domain, the first request indicating that the client device is configured to restrict cross-domain redirection;

determining, by the data processing system, responsive to the first domain being different from the second domain and the first request indicating that the client device is configured to restrict cross-domain redirection, that the first request comprises a content type header set to a first content type;

generating, by the data processing system, responsive to determining that the first request comprises the content type header set to the first content type, a response comprising a header and a body, the header of the response having a status identifier of a first status type, the body of the response having an address for the content element without redirecting the client device; and transmitting, by the data processing system, the response to the client device to cause the client device to transmit a second request for the content element to the address included in the body of the response to insert in the content slot.

2. The method of claim 1, further comprising determining, by the data processing system responsive to the first domain being different from the second domain, that the first domain corresponds to one of a plurality of permitted domains for the content element; and wherein generating the response further comprises generating the response responsive to determining that the first domain corresponds to one of the plurality of permitted domains.

3. The method of claim 1, further comprising determining, by the data processing system, that a number of requests for the content element from the client device is less than a threshold number, responsive to receiving the first request, and wherein generating the response further comprises generating the response to include the address for the content element in the body of the response, responsive to determining that the number of requests is less than the threshold number.

4. The method of claim 1, wherein receiving the first request further comprises receiving the first request including at least one of an application profile of the client device, a device type for the client device, a method type used to generate the first request, or an identifier indicating that the client device is configured to restrict cross-domain redirection; and further comprising:

determining, by the data processing system, that the client device is configured to restrict cross-domain redirection based on at least one of the application profile, the device type, the method type, or the identifier included in the first request.

5. The method of claim 1, wherein receiving the first request further comprises receiving the first request for the content element at a second address of the first domain; and further comprising:

identifying, by the data processing system, responsive to determining that the client device is configured to restrict cross-domain redirection, the address for the content element corresponding to the second address included in the first request.

6. The method of claim 1, wherein transmitting the response to the client device further comprises transmitting the response to the client device to return the second request for the content element, the second request comprising a header and a body, the header of the second request having the address of the response, the body of the second request having a content type header set to a second content type different from the first content type.

7. The method of claim 1, wherein generating the response further comprises generating the response to include the status identifier of the first status type, the first status type lacking a redirection status to cause the client device to retrieve the content element without redirection.

8. A system for delivering cross-site content, comprising:

a data processing system having one or more processors coupled with memory, configured to:

receive, from a client device, a first request for a content element at a first domain to insert in a content slot at a second domain, the first request indicating that the client device is configured to restrict cross-domain redirection;

determine, responsive to the first domain being different from the second domain and an indication that the client device is configured to restrict cross-domain redirection, whether a content type header of the first request is set to a first content type or a second content type;

transmit, to the client device, responsive to the determination that the content type header is set to the first content type, a first response comprising a first header and a first body, the first header having a first status identifier of a first status type, the first body having an address for the content element in a body, to cause the client device to return a second request for the content element using the address without redirecting the client device; and transmit, to the client device, responsive to the determination that the content type header is set to the second content type, a second response comprising a second header and a second body, the second header having a second status identifier of a second status type, the second body having the content element corresponding to the address, to cause the client device to present the content element in the body of the response on the content slot.

9. The system of claim 8, wherein the data processing system is further configured to:

determine, responsive to the receipt the first request, that a number of requests for the content element from the client device is less than a threshold number; and generate, responsive to the determination that the number of requests is less than the threshold number, the first response to include the first status identifier of the first status type in the first header and the address for the content element in the first body.

10. The system of claim 8, wherein the data processing system is further configured to:

determine, responsive to the first domain being different from the second domain, that the first domain corresponds to one of a plurality of permitted domains for the content element; and transmit, responsive to the determination that the first domain corresponds to one of the plurality of permitted domains, at least one of the first response or the second response to the client device.

11. The system of claim 8, wherein the data processing system is further configured to:

receive the first request including at least one of an application profile of the client device, a device type for the client device, a method type used to generate the first request, or an identifier indicating that the client device is configured to restrict cross-domain redirection; and determine that the client device is configured to restrict cross-domain redirection based on at least one of the application profile, the device type, the method type, or the identifier included in the first request.

12. The system of claim 8, wherein the data processing system is further configured to:
   determine, responsive to the determination that the content type header is set to the second content type, that the client device is configured to restrict automatic rendering of the content element encoded in a first format based on the first request; and
   identify, responsive to the determination that the client device is configured to restrict automatic rendering, the content element in a second format different from the first format, the client device configured to permit automatic rendering of content in the second format.

13. The system of claim 8, wherein the data processing system is further configured to identify, responsive to the determination that the content type header is set to the first content type, the address for the content element corresponding to a second address included in the first request, the second address of the first domain.

14. The system of claim 8, wherein the data processing system is further configured to retrieve, responsive to the determination that the content type header is set to the second content type, the content element corresponding to the address to be included in the second body of the second response.

15. A system for retrieving cross-site content, comprising:
   a client device having one or more processors coupled with memory, configured to:
      transmit, to a data processing system, a first request for a content element at a first domain to insert in a content slot at a second domain, the first request including a first content type header set to one of a first content type or a second content type, the first request indicating that the client device is configured to restrict cross-domain redirection;
      receive, from the data processing system, a response comprising a header and a body, the header of the response including a status identifier to prevent redirection of the client device, the body of the response including one of an address for the content element or the content element;
      determine, responsive to the receipt of the response, whether the body of the response includes the address for the content element or the content element;
      transmit, to the data processing system, responsive to the determination that the body of the response includes the address for the content element, a second request for the content element having a header, the header of the second request having the address for the content element and a second content type set to the second content type; and
      present, responsive to the determination that the body of the response includes the content element, the content element in the content slot.

16. The system of claim 15, wherein the client device is further configured to:
   determine that the first domain referenced by the content element differs from the second domain referenced by the content slot; and
   generate, responsive to the determination the first domain differs from the second domain, the first request to include an identifier indicating that the client device is configured to restrict cross-domain redirection.

17. The system of claim 15, wherein the client device is further configured to:
   determine whether the first request to be transmitted to the data processing system is an initial request for the content element;
   set, responsive to the determination that the first request is the initial request, the first content type header to the first content type to indicate to the data processing system to provide the address for the content element in the body of the response; and
   set, responsive to the determination that the first request is not the initial request, the first content type header to the second content type to indicate to the data processing system to provide the content element in the body of the response.

18. The system of claim 15, wherein the client device is further configured to:
   determine, responsive to the determination that the body of the response includes the content element, that the content element is encoded in a first format and not a second format, the client device configured to permit automatic presentation of content in the first format and to restrict automatic presentation of content in the second format; and
   automatically present, responsive to the determination that the content element in the first format and not the second format, the content element.

19. The system of claim 15, wherein the response further comprises a content type header set to one of the first content type or the second content type; and
   determine, responsive to the content type header of the response set to the first content type, that the body of the response includes the address for the content element; and
   determine, responsive the content type header of the response set to the second content type, that the body of the response includes the content element.

20. The system of claim 15, wherein the client device is further configured to execute, responsive to the determination that the body of the response includes the content element, an executable included in the body of the response to play the content element in the content slot.

* * * * *

UNITED STATES PATENT AND TRADEMARK OFFICE
CERTIFICATE OF CORRECTION

PATENT NO. : 11,562,138 B2
APPLICATION NO. : 16/983525
DATED : January 24, 2023
INVENTOR(S) : Murtaza Halai et al.

It is certified that error appears in the above-identified patent and that said Letters Patent is hereby corrected as shown below:

In the Claims

Column 34, Line 45, Claim 9 "receipt the" should be -- receipt of the --.

Column 36, Line 11, Claim 16 "determination the" should be -- determination that the --.

Column 36, Line 48, Claim 19 "responsive the" should be -- responsive to the --.

Signed and Sealed this
Twelfth Day of September, 2023

Katherine Kelly Vidal
*Director of the United States Patent and Trademark Office*